Patented Dec. 6, 1938

2,138,829

UNITED STATES PATENT OFFICE 2,138,829

MANUFACTURE OF BONDED ABRASIVE ARTICLES

Raymond C. Benner and Peter de Leeuw, Niagara Falls, N. Y., assignors, by mesne assignments, to The Carborundum Company, Niagara Falls, N. Y., a corporation of Delaware No Drawing. Application July 9, 1936,
Serial No. 89,845

5 Claims. (Cl. 51—280)

This invention relates to the production of bonded abrasive articles. More particularly the invention relates to the bonding of aluminous abrasive grain into hard, dense abrasive articles by the reaction of lime (or other alkaline earths such as MgO, SrO and BaO) with silica and other compounds.

The invention has for a principal object the production of abrasive articles which are hard, strong and unaffected by extreme temperature from aluminous abrasive material such as corundum, fused alumina, aluminous garnet and emery. Another object of the invention is to provide a method of making aluminous abrasive articles which avoids the use of extreme temperatures and in which the size of the article made involves no special problem.

The invention contemplates the formation of bonded abrasive articles from abrasive material consisting essentially of aluminous compounds, such as aluminum oxide, aluminous garnet and other alumino-silicates, boro-aluminates, etc. by the hydro-thermal reaction of the abrasive grain, lime (or other alkaline earths) and silica, with or without the addition of other materials such as finely divided alumina, or aluminous compounds such as $3Al_2O_3.2SiO_2$, $CaO.Al_2O_3.2SiO_2$, $5CaO.3Al_2O_3$, and $Al_2O_3.MgO$.

The invention will be described by reference to specific embodiments, but it will be understood that the invention is not thereby limited to but is directed broadly to the production of bonded abrasive articles of aluminous abrasive material by the hydrothermal reaction of the abrasive material used and a plurality of compounds including essentially an alkaline earth and silica.

Aluminum oxide, in the form of natural corundum or the synthetic corundum produced by the fusion of bauxite, is the most used abrasive material and is well adapted for use in carrying out the present invention.

The new abrasive articles are hardened by application of heat and temperature in the presence of moisture. This is conveniently accomplished by subjecting the article to saturated steam, for example, in an autoclave. The steam pressure used should not be so high as to exceed the inversion point of the reaction product formed and a pressure of 100 to 300 pounds per square inch is ordinarily satisfactory. The most favorable pressure will depend upon the composition of the mixture used in forming the article.

The abrasive grain used will naturally be selected with reference to the use to which the abrasive article is to be put. However, for the production of relatively dense articles, such as pulp wheels, it is advisable to select grains having a range of sizes such as to allow the particles of the mix to pack properly and form a dense article when the mixture is pressed or tamped in a mold.

The description of the invention refers to specific embodiments in which the grain used consists of a mixture of grit sizes ranging from 5 or 6% of a size which will be retained on a 54 mesh screen to about 10% which will pass through a 97 mesh screen, the bulk being of a size which will be retained on a 70 mesh screen. This size is merely selected for purposes of illustration in order that the various embodiments may be comparable and it is to be understood that the invention is in no way limited to the use of the size or combination of grits used in the specific embodiments.

The silica should be finely divided and may be in the form of flint or other silica-bearing or siliceous materials may be employed.

It is preferable that the bond ingredients (that is all the ingredients of the mix other than the abrasive grain) should be prepared in a finely divided condition. Ball milling the ingredients is of assistance in this connection. It is also preferable that the mixing of the bond ingredients and the abrasive grain be as thorough as possible. Preferably the dry ingredients are mixed thoroughly first and the water, necessary to render the mixture sufficiently damp for molding or tamping, is then added very slowly while mixing. Too rapid addition of water to the mix causes the agglomeration of the binder into lumps which cause weak spots in the resulting structure, and non-uniformity. These lumps also cause uneven expansion of the article during the hardening process with the result that cracks may be formed in the article.

The amount of water added to the mix should in general be not more than is necessary to prevent the formation of pressure cracks. If too much water is added the articles will, after molding, be more or less soft and easily subject to mechanical strain during handling.

The mix may be formed into articles of the desired size and shape by forming them in a mold of suitable dimensions and consolidating them by means of a ram or by tamping. The pressure should be high enough in the case of a ram to thoroughly consolidate the mixture and pressures of 3000 to 6000 lbs./sq. in. are suitable for this purpose. The articles formed by tamping are subjected to the hardening step in a closed mold.

Example I 12 parts lime and 18 parts finely divided silica, preferably of the order of magnitude of 600 mesh, are intimately mixed in the dry condition. These ingredients may be ball milled to improve the fineness and uniformity of mixture. 30 parts of the lime-silica mixture are than mixed with 70 parts of fused alumina abrasive grain having a grit size as described above so that there is a complete mixture of the bond component with the abrasive grain. 11 parts of water are than slowly added while agitating the grain and bond mixture to prevent the formation of bond lumps. The damp mix is then screened through a 12 mesh screen to further insure uniformity of the mixture and may then be molded into articles of the desired shape, for example, in a pressure mold under a pressure of 3000 lbs./sq. in. Articles thus formed are cured and hardened in an autoclave having a saturated steam pressure of 120–140 lbs./sq. in. for a period of 24 hours.

Abrasive pieces made by the above method exhibit a tensile strength of about 1100 lbs. per square inch.

Example II

It is found that the addition to the bond formula (ordinarily at the expense of the silica) of a small proportion of finely divided aluminum oxide, for example, levigated alumina, produces articles of superior strength and hardness. 12 parts lime and 16 parts flint preferably of the order of magnitude of 325 mesh and finer, and 2 parts levigated alumina are intimately mixed in the dry condition. The ingredients may be ball milled as above to improve the fineness and uniformity of the mixture. 70 parts of fused alumina abrasive grain are then added and intimately mixed in the dry condition. 10 parts water are then added while mixing to prevent the formation of bond lumps. The damp mix is then screened through a 10 mesh screen to further insure uniformity and molded into articles of the desired shape, for example, in a mold under a pressure of 3000 lbs./sq. in. The article may then be stored for twelve days under sand before curing but this is not necessary. The article is cured and hardened in an autoclave having a saturated steam pressure of 195–210 lbs./sq. in. for 8 hours. Articles made as described above exhibit a tensile strength of approximately 1350 lbs./sq. in.

The levigated alumina is made up of fine particles of colloidal size which cohere to form the grains of the material. These grains are broken up substantially by the mixing of the ingredients so that the size of the levigated alumina is not important if the mixing is thorough.

The fine alumina used need not be levigated alumina, as finely divided fused aluminum oxide may be used. This material should ordinarily be 400 mesh or finer and articles produced therefrom are substantially as strong as those made from the levigated alumina.

The proportions of the ingredients used in the above formulae are merely for purposes of example, and may be varied between relatively wide limits without greatly affecting the results. For example, based upon the weight of the dry ingredients, the lime may be varied from 10.5 to 13.0%, the silica from 13.5 to 18.5% and the fine alumina from 1.0 to 4.0% without showing any particular variations in strength in the articles made therefrom.

Example III

Other aluminous material may be used instead of or in addition to the finely divided aluminum oxide. If in the procedure wherein articles are made from a bond consisting of 12 parts lime and 18 parts silica, with 70 parts abrasive grain, molded under 3000 lbs. pressure and cured for 14 hours at 120–140 lbs. saturated steam pressure, 3 parts silica are replaced with 3 parts of aluminum silicate ($3Al_2O_3.2SiO_2$), calcium aluminum silicate ($CaO.Al_2O_3.2SiO_2$), 5.3 calcium aluminate ($5CaO.3Al_2O_3$), or magnesium aluminate ($MgO.Al_2O_3$) the tensile strength of the articles produced is increased about 20%.

In connection with the invention it is found that soaking articles in boiling water after curing permanently increases their strength, with the articles having a higher initial strength showing a relatively lower percentage increase than articles having a lower initial strength. For example, immersing the articles produced, as described just above, in boiling water for one month results in an average increase of 6% in the tensile strength, whereas soaking the articles made without the addition of aluminous materials shows an increase of 20%. If in the above example, instead of 3 parts silica, 5 or 6 parts are replaced with the aluminous material, the initial strength is substantially lower than in the case of the substitution of 3 parts of the aluminous material. However, soaking the articles in boiling water for one month results in an increase in strength of 20 to 25% giving the articles a tensile strength of the same order of magnitude as the ultimate strength of the articles having a higher initial strength.

In molding, a relatively high molding pressure has a favorable effect on the strength of the article produced. This depends upon the ingredients of the mixture, the fineness of subdivision, and the consistency, that is, the amount of water present. Where the water is in excess so that the pressing operation causes the deposition of water on the mold the use of higher pressure is generally not advisable. However, with dry mixtures, and those which have just the right amount of water, it has been found that increasing the molding pressure from 3000 lbs./sq. in. to 6000 lbs./sq. in. produces an increase in strength in the resulting article from 10 to 30%.

After molding, it is advisable to store the articles in the green state under sand for a few days before curing, as it is found that this improves the strength of the cured articles.

In contrast to abrasive articles made with other bonds those produced by the present invention do not lose strength when subjected to the leaching action of boiling water, but on the contrary usually become stronger. The formation of large monolithic articles, such as monolithic pulp wheels, does not offer special difficulties in the present invention because the pressure-temperature relationships insure uniformity of curing throughout the mass regardless of size.

The time required for curing is shorter than that for most other abrasive bonds. A good strength may be obtained in a few hours. Reinforcements such as metal or mineral articles may be placed in the article during the molding and the curing process will not affect them.

After pressing and before induration the article has a certain hardness which permits easy alterations in shape by shaving or other means, and the hardened article will have the exact shape to which it is molded or to which it is altered, as the changes in size during induration are insignificant.

We claim:

1. A bonded abrasive article comprising aluminous abrasive grain and a binder comprising the hydrothermal reaction products of CaO, $SiO_2$ and $Al_2O_3$.

2. The method of making bonded abrasive articles which comprises the steps of forming a damp, granular mass by intimately admixing aluminous abrasive grain, finely divided siliceous material, an alkaline earth, and water, compacting and molding the mass in the shape desired, and subjecting the thus formed article to the action of heat and moisture under pressure.

3. The method of making bonded abrasive articles which comprises intimately admixing finely divided aluminous material with water, aluminous abrasive grain, an alkaline earth and finely divided siliceous material to form a damp, granular mixture, compacting and molding said mixture in the shape desired, and subjecting the shaped mass to the action of heat and moisture under pressure.

4. The method of making bonded abrasive articles which comprises the steps of forming a damp granular mass by intimately admixing aluminous abrasive grain, finely divided siliceous material, an alkaline earth, and water, compacting and molding the mass in the shape desired, subjecting the shaped mass to the action of heat in the presence of water vapor to prevent the evaporation of essential reacting water and thereafter increasing its strength by soaking the thus formed article in boiling water for a substantial period of time.

5. A bonded abrasive article comprising aluminous abrasive grain and a binder comprising the hydrothermal reaction products of silica, an alkaline earth and a substance selected from the group of derivatives of aluminic acid consisting of $3Al_2O_3.2SiO_2$, $CaO.Al_2O_3.2SiO_2$, $5CaO.3Al_2O_3$, $Al_2O_3.MgO$, and $Al_2O_3$.

RAYMOND C. BENNER.
PETER DE LEEUW.